United States Patent [19]
Garrido

[11] Patent Number: 6,036,253
[45] Date of Patent: Mar. 14, 2000

[54] LIGHT WEIGHT SEAT TRACK ASSEMBLY

[75] Inventor: Pascal Garrido, Gravehurst, Canada

[73] Assignee: Dura Automotive Systems Inc., Rochester Hills, Mich.

[21] Appl. No.: 09/115,924

[22] Filed: Jul. 15, 1998

[51] Int. Cl.[7] .................................................. B60N 2/02
[52] U.S. Cl. ..................................... 296/65.13; 296/65.14
[58] Field of Search ............................... 296/65.13, 65.14

[56] References Cited

U.S. PATENT DOCUMENTS

| | | | |
|---|---|---|---|
| 4,761,036 | 8/1988 | Vogel | 297/452 |
| 4,787,667 | 11/1988 | Nishino | 296/65.13 |
| 4,969,622 | 11/1990 | Münchow et al. | 296/65.14 |
| 5,048,787 | 9/1991 | Saitoh | 296/65.14 |
| 5,213,300 | 5/1993 | Rees | 248/429 |
| 5,746,409 | 5/1998 | Rees | 248/422 |

FOREIGN PATENT DOCUMENTS

| | | | |
|---|---|---|---|
| 3323431 A1 | 1/1985 | Germany | 296/65.14 |
| 2219933 | 12/1989 | United Kingdom | 296/65.14 |

*Primary Examiner*—Gary C. Hoge
*Attorney, Agent, or Firm*—Robert Kelley

[57] ABSTRACT

A vehicle seat assembly is attached to a vehicle support structure by a mounting assembly. The mounting assembly includes a first track and a second track supported for movement relative to the first track. This allows the seat assembly to be adjusted forwardly or rearwardly by a seat occupant. The seat assembly preferably includes a seat belt assembly that is supported solely by the seat assembly. Thus, all forces that are exerted on the seat assembly are transferred to the mounting assembly. An aluminum track assembly is provided to reduce weight and overall cost of the mounting assembly. The first track has a first pair of sidewalls interconnected by a first base portion and the second track has a second pair of sidewalls interconnected by a second base portion. The first pair of sidewalls each have a first arcuate bearing surface and the second pair of sidewalls each have a second arcuate bearing surface opposite from the first arcuate bearing surface. A bearing member is inserted between the first and second tracks and presents a bearing surface for engaging the first and second arcuate bearing surfaces. The bearing member resiliently supports the second track with respect to the first track.

19 Claims, 2 Drawing Sheets

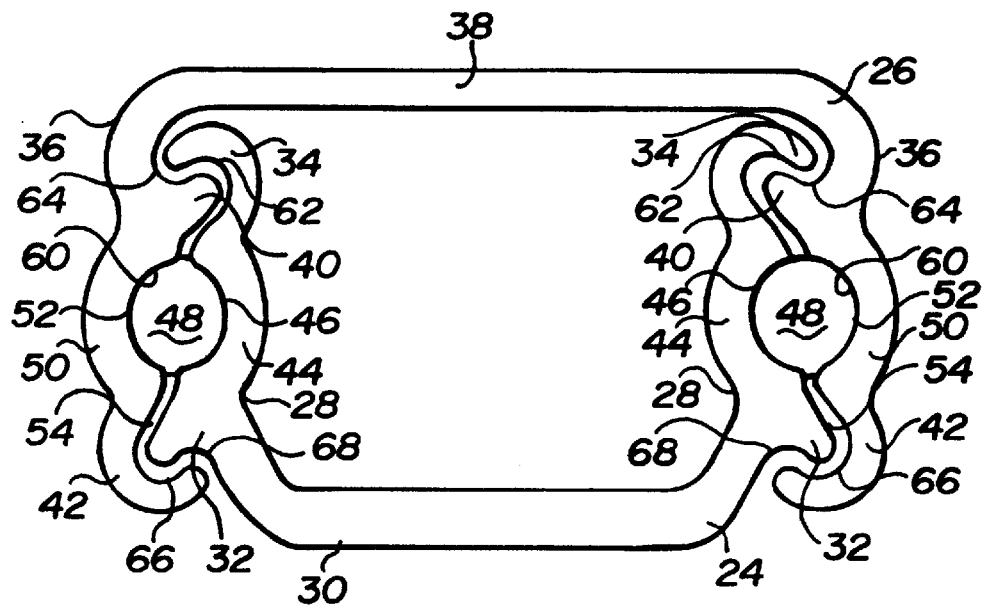
Fig-3
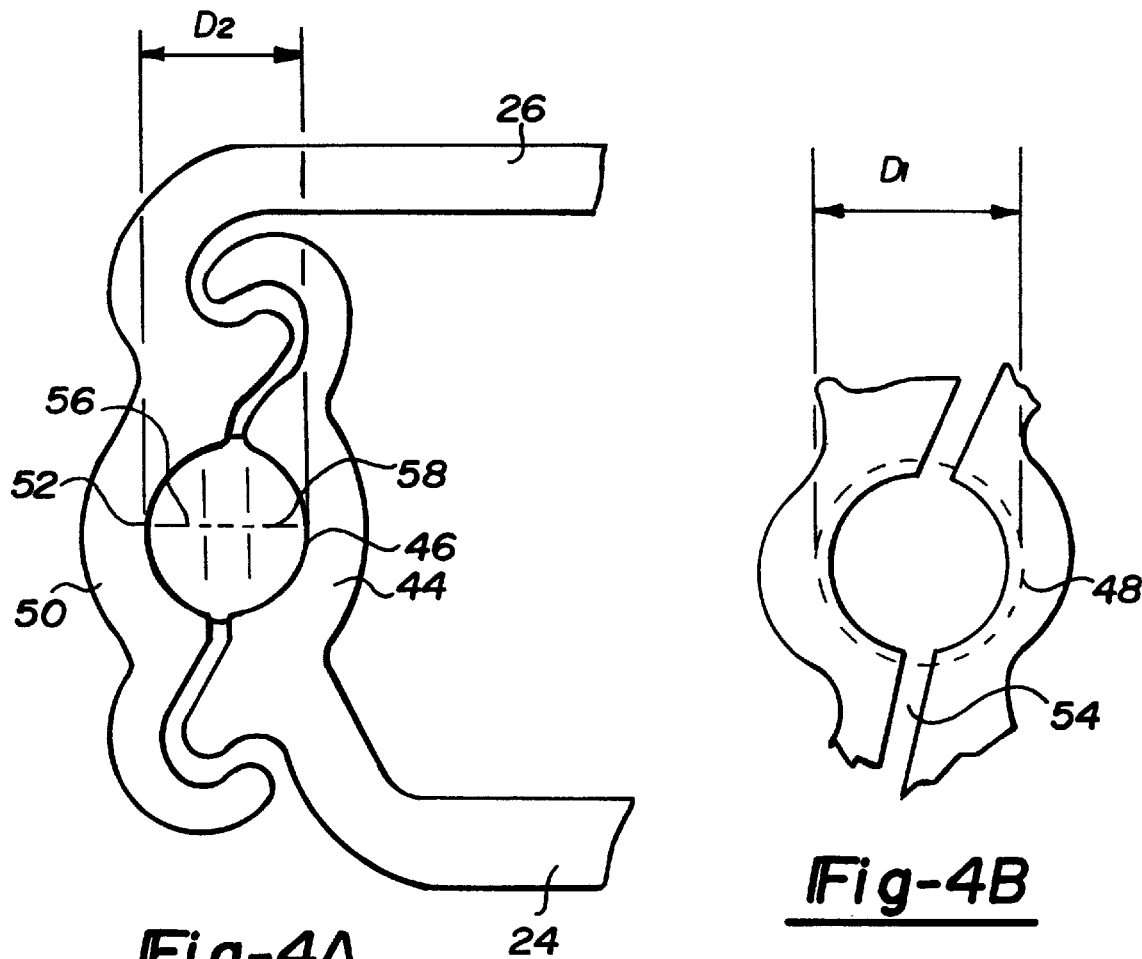
Fig-4A
Fig-4B

LIGHT WEIGHT SEAT TRACK ASSEMBLY

BACKGROUND OF THE INVENTION

This application relates generally to an assembly for mounting a seat within a vehicle. More particularly, this invention relates to a light weight seat mounting assembly with a first and second track members having an arcuate bearing surfaces for engaging a bearing member such that the second track is resiliently supported with respect to the first track.

Seat track arrangements for mounting seat assemblies within vehicles are generally well known. Most arrangements provide for a seat to be moved or adjusted in forward and rearward directions within a vehicle. Usually the seat assembly includes a mounting assembly for mounting the seat assembly to a vehicle structure.

Seats usually have a seat belt assembly including a lap belt and a shoulder belt for holding a seat occupant in the seat. The seat belt assemblies can be attached to the seat and/or vehicle structures in any number of ways. The lap belts and shoulder belts can be attached to a vehicle structure such as a vehicle floor and/or pillar member. Other seats have the lap belt attached to a vehicle structure with the shoulder belt attached to the seat itself or have the lap belt attached to the seat and the shoulder belt attached to the vehicle structure.

Some seat assemblies have seat belt assemblies that are supported solely by the seat assembly. A seat occupant who is belted into the seat assembly will exert a force on the seat assembly when the occupant experiences a deceleration load. This is known as an "all belts to seat" load. This seat load is transferred to the mounting assembly. Thus, the mounting assemblies must be strong enough to securely hold the seat assembly in place and prevent the seat from separating from vehicle structures during a sudden deceleration.

Mounting assemblies that are used to mount the seat to the vehicle are often complex, especially when the mounting assemblies include additional track strengthening components that are added to the mounting assembly in order to support an "all belts to seat" load or a partial seat belt load. Also the mounting assemblies typically include track members that are made of steel, which increases the overall weight of the mounting assembly. These complex mounting assemblies require a great number of components, which increases the assembly time, adds weight to the vehicle, and increases the overall cost of the seat assembly.

Accordingly, it is desirable to provide a durable and robust seat mounting assembly that reduces the number of components and decreases the overall assembly cost, yet which is capable of supporting an "all belts to seat" or partial seat belt load. Also, it is desirable to provide track members formed from a light weight material, such as aluminum for example, in order to further decrease the weight of the mounting assembly while providing a high strength assembly.

SUMMARY OF THE INVENTION

This invention relates to a vehicle seat assembly that is attached to the vehicle by a mounting assembly. The seat assembly preferably includes a seat belt assembly that is supported solely by the seat assembly but can also be used with other seat belt arrangements. When the seat belt assembly is solely supported by the seat, a seat occupant who is belted into the seat assembly will exert a force on the seat assembly when the occupant experiences a deceleration load. This is known as an "all belts to seat" load. This force or seat load that is exerted on the seat assembly is transferred to the mounting assembly.

In a preferred embodiment of this invention, the assembly for mounting a seat within a vehicle includes a first track having a first pair of non-linear sidewalls interconnected by a first base portion and a second track supported for movement relative to the first track and having a second pair of non-linear sidewalls spaced apart from the first pair of non-linear sidewalls and interconnected by a second base portion. The first pair of non-linear sidewalls each have a first extension and a first curved distal end opposite from the first extension. The first extension extends outwardly from the sidewall adjacent to the first base portion. The second pair of non-linear sidewalls each have a second extension and a second curved distal end opposite from the second extension. The second extension extends outwardly from the sidewall adjacent to the second base portion. The first extensions on the first track are adjacent to the second curved distal ends of the second pair of non-linear sidewalls and the second extensions on the second track are adjacent to the first curved distal ends of the first pair of non-linear side walls.

The subject invention offers several advantages over prior art mounting assemblies because it provides a durable and robust mounting assembly that reduces the overall number of parts, reduces weight and overall assembly cost.

These and other features and advantages of the present invention will be best understood from the following specification and drawings, the following of which is a brief description.

BRIEF DESCRIPTION OF THE DRAWINGS

FIG. 3 is a cross sectional view of a preferred embodiment of a seat track assembly.

FIG. 4A is a cross sectional view, partially cut away, of the seat track assembly shown in FIG. 2.

FIG. 4B is a cross sectional view, partially cut away, of the seat track assembly shown in FIG. 2 and including a bearing member.

DETAILED DESCRIPTION OF THE PREFERRED EMBODIMENT

Figure 1:
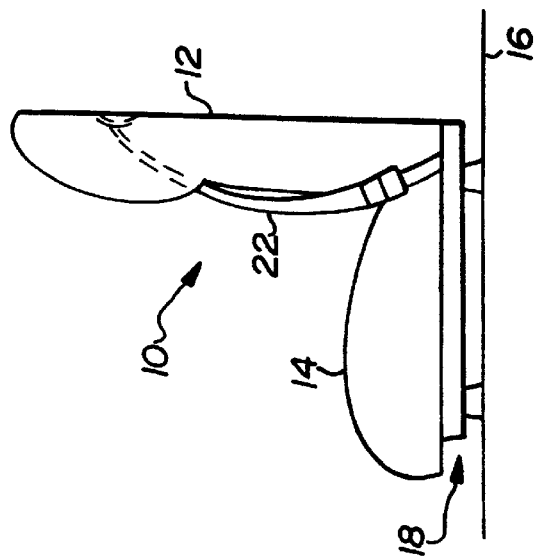
FIG. 1 is a side schematic view of a seat assembly mounted to a vehicle structure.

FIG. 1 illustrates a vehicle seat assembly 10 with a seat back 12 supported with respect to a seat bottom 14, as is well known in the art. The seat assembly 10 is mounted to a vehicle structure 16, such as a vehicle floor, by a mounting assembly, shown generally at 18. The mounting assembly 18 includes track assemblies 20 on an inboard side and an outboard side of the seat assembly 10, only the outboard side is shown in FIG. 1. The terms inboard and outboard are used in this description for clarity and illustration purposes only and cannot be considered limiting.

The track assembly 20 is preferably used on a seat 10 that has a seat belt assembly 22 solely supported by the seat 10, as shown in FIG. 1. This means that when a seat occupant is belted into the seat 10 the seat will be subject to a higher seat load than if the seat belt assembly 11 were supported by a vehicle structure. When the seat occupant experiences a deceleration the seat 10 experiences a seat load, which is transferred to the inboard and outboard track assemblies 20. This is known as an "all belts to seat" load.

While the track assembly 20 is preferably used on a seat 10 that has the seat belt assembly 22 solely supported by the seat 10, the track assembly 20 can be used on other types of seat belt arrangements well known in the art. For example, the track assembly 20 could be used on a seat having part of the seat belt supported by the seat and part of the seat belt supported by a vehicle structure such as a vehicle floor or vehicle pillar. These types of seat belt arrangements are known as a "travel inboard buckle" or "lap belt to seat" applications.

Figure 2:
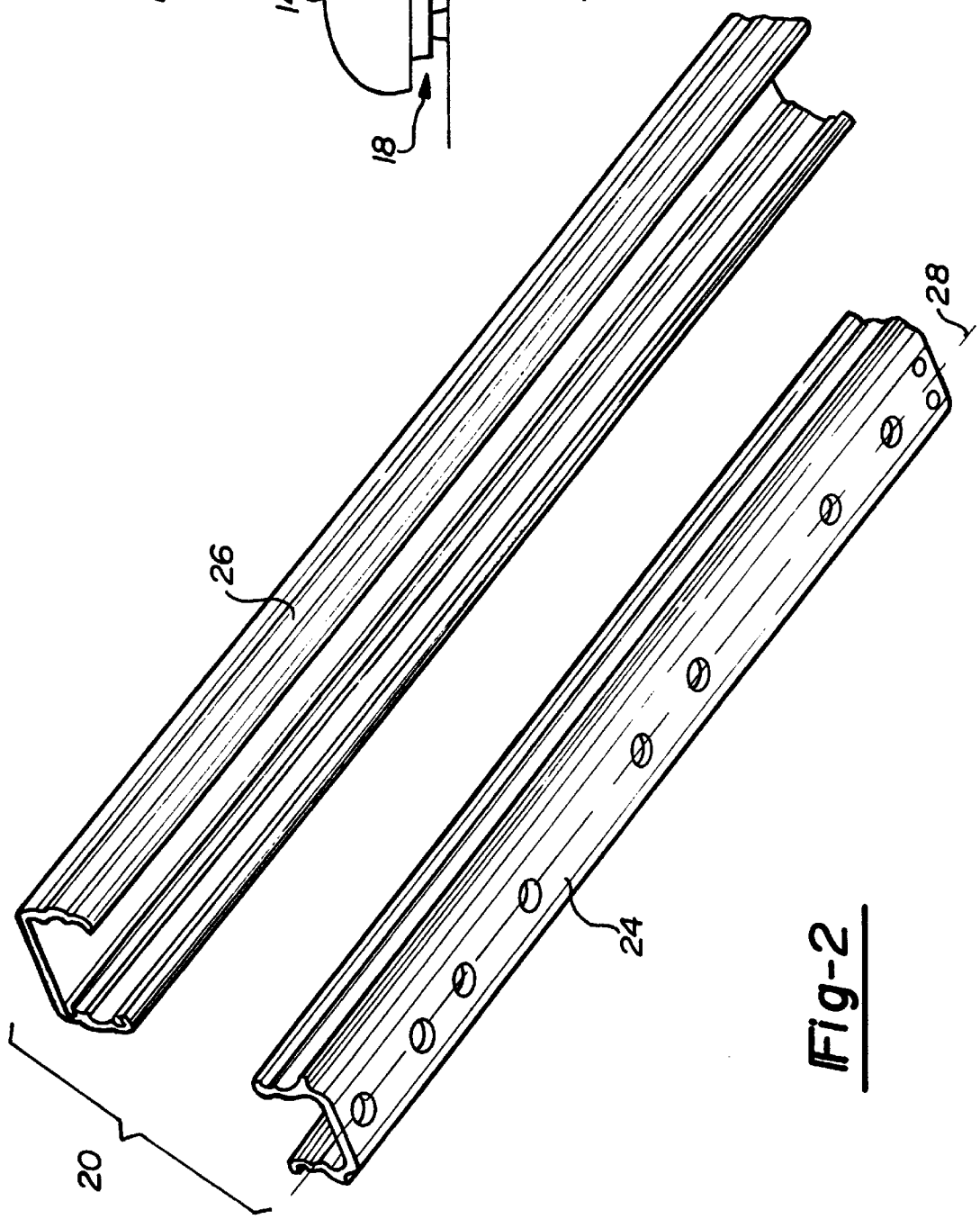
FIG. 2 is a perspective exploded view of a preferred embodiment of track members designed according to this invention.

The track assembly 20 is shown in greater detail in FIG. 2. Both the inboard and outboard track assemblies include a first track 24 and a second track 26. The first track 24 is preferably a lower track 24 that is fixedly mounted to the vehicle structure 16 such as a vehicle floor, for example. The second track 26 is an upper track 26 and is received over the lower track 24 so that the upper track 26 can be moved in a forward or rearward direction relative to the lower track 24. The terms forward, rearward, upper, and lower, as used in this description, are for illustration purposes only and cannot be considered limiting. The profiles of the lower track 24 and the upper track 26 ensure that the upper track 26 only moves along a longitudinal axis 28 of the tracks 24, 26 and does not move in other directions.

The inboard and outboard track assemblies 20 preferably have the same cross sectional shape as shown in FIGS. 2–4, thus the following description will be directed towards the outboard track assembly 20 with the understanding that a similar description also applies to the inboard track assembly 20.

The lower 24 and upper 26 tracks are preferably made of a light weight material, such as aluminum, for example. Forming the lower 24 and upper 26 tracks from aluminum significantly reduces the overall weight of the mounting assembly 18 for the seat 10 when compared to prior art mounting assemblies. In addition to being light weight, the preferred cross section shapes of the tracks 24, 26, shown in FIG. 3, provide adequate structural strength for "all belts to seat" type loading.

The lower track 24 has a first pair of non-linear sidewalls 28 interconnected by a lower base portion 30. The first pair of non-linear sidewalls 28 each have a first extension 32 extending outwardly from its respective sidewall 28 adjacent to the first base portion 30. Each of the first pair of sidewalls 28 also has a first curved distal end 34 located opposite from the first extension 32.

The upper track 26 has a second pair of non-linear sidewalls 36 spaced apart from the first pair of non-linear sidewalls 28 and interconnected by an upper base portion 38. The second pair of non-linear sidewalls 36 each have a second extension 40 extending outwardly from its respective sidewall 36 adjacent to the second base portion 38. Each of the second pair of sidewalls 36 also has a second curved distal end 42 located opposite from the second extension 40.

In the preferred embodiment, the first extensions 32 on the lower track 24 are adjacent to the second curved distal ends 42 of the second pair of non-linear sidewalls 36 and the second extensions 40 on the upper track 26 are adjacent to the first curved distal ends 34 of the first pair of non-linear side walls 28.

The first pair of sidewalls 28 each have a first arcuate support portion 44 located between the first extension 32 and the first curved distal end 34. The first arcuate support portion 44 presents a first bearing surface 46 for engaging a bearing member 48, discussed in greater detail below. The second pair of sidewalls 36 each have a second arcuate support potion 50 located between the second extension 40 and the second curved distal end 42. The second arcuate support portion 50 presents a second bearing surface 52 for engaging bearing member 48. The bearing member 48 presents an exterior bearing surface 60 that is in engagement with the first 46 and second 52 bearing surfaces to allow the upper track 26 to move forward or rearward with respect to the lower track 24.

In the preferred embodiment, the first pair of non-linear sidewalls 28 are located between the second pair of non-linear sidewalls 36 such that a gap 54 or guideway is formed between the lower 24 and upper 26 tracks. It should be understood that an alternate configuration with the second pair of non-linear sidewalls 26 being located between the first pair of non-linear sidewalls 28 could also be used.

In the preferred arrangement shown in FIG. 3, the first curved distal ends 34 curve outwardly from the first pair of non-linear sidewalls 28 toward the second pair of non-linear sidewalls 36. The second extensions 40 extend inwardly from the second pair of non-linear sidewalls 36 toward the first pair of non-linear sidewalls 28. The second extensions 40 are for engaging the first curved distal ends 34 to prevent the upper track 26 from separating from the lower track 24 during high deceleration loads.

Also, in this arrangement, the second curved distal ends 42 curve inwardly from the second pair of sidewalls 36 toward the first pair of sidewalls 28 and the first extensions 32 extend outwardly from the first pair of non-linear sidewalls 28 toward the second pair of non-linear sidewalls 36. The first extensions 32 are for engaging the second curved distal ends 42 to prevent the upper track 26 from separating from the lower track 24 during high deceleration loads.

The first curved distal end presents a curved surface 62 that faces a curved surface 64 presented by the second extension 40, and the second curved distal end 42 presents a curved surface 66 that faces a curved surface 68 presented by the first extension 32. Thus, the first curved distal ends 34 and the second extensions 40 have a hook style relationship and the second curved distal ends 42 and the first extensions 32 have a hook style relationship for preventing track separation during a high "all belts to seat load." As previously mentioned, it should be understood that the positions of the lower 24 and upper 26 tracks can be reversed such that the lower track 24 would become the upper track and the upper track 26 would become the lower track.

As shown in FIG. 4A, the first arcuate support portion 44, with the first bearing surface 46, defines a first center 56. The second arcuate support portion 50, with the second bearing surface 52, defines a second center 58 that is different than the first center 56. This allows the bearing member 48 to be inserted between the lower 24 and upper 26 tracks in an interference fit, discussed in greater detail below. The interference fit allows the upper track 26 to be resiliently supported with respect to the lower track 24.

As discussed above, the upper track 26 is supported on the bearing member 28 located between the tracks 24, 26. The bearing member 48 is engaged by the first 44 and second 50 arcuate support portions. The bearing member 48 is preferably a ball bearing defining a first diameter D1, shown in FIG. 4B. In the preferred embodiment, a plurality of ball bearings, each having substantially the same diameter D1, are inserted into the gap 54 between the tracks 24, 26. The ball bearings are also preferably made from a plastic type material for weight reduction and quiet operation, however, other material types known in the art can be used.

The first 44 and second 40 arcuate support portions together define a second diameter D2, shown in FIG. 4A. The second diameter D2 is less than the first diameter D1 of the bearing member 48, which further enhances the interference fit discussed above, shown in FIG. 4B.

The preferred method for assembling the seat track assembly includes the steps of fixing the lower track 24 to the vehicle structure 16, supporting the upper track 26 relative to the first track 24 such that a gap 54 having a first predetermined cross sectional area is formed, and inserting at least one bearing member 48 into the gap 54 between the tracks 24, 26 for resiliently supporting the upper track 26 for movement relative to the lower track 24. Preferably, at least one bearing member 48 is comprised of a plurality of bearing members 48 each having a second predetermined cross sectional area that is less than the second cross sectional area. The method further includes the step of pressing each of the bearing members 48 into the gap 54 for forming an interference fit between the bearing members 48 and the lower 24 and upper tracks 26.

As the bearing members 48 are pressed into the gap 54, the upper track 26 is pushed away from the lower track 24. This provides the resiliency between the tracks 24, 26.

The subject invention offers several advantages over prior art "all belts to seat" mounting assemblies because it provides a light weight, durable, and robust mounting assembly that reduces the overall number of parts, reduces weight and overall assembly cost.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A seat track assembly for a vehicle comprising:
   a first track having a first pair of non-linear sidewalls interconnected by a first base portion, said first pair of non-linear sidewalls each having a first extension extending outwardly from said sidewall adjacent to said first base portion and a first curved distal end opposite from said first extension; and
   a second track supported for movement relative to said first track, said second track having a second pair of non-linear sidewalls spaced apart from said first pair of non-linear sidewalls and interconnected by a second base portion, said second pair of non-linear sidewalls each having a second extension extending outwardly from said sidewall adjacent to said second base portion and a second curved distal end opposite from said second extension wherein said first extensions on said first track are adjacent to said second curved distal ends of said second pair of non-linear sidewalls and said second extensions on said second track are adjacent to said first curved distal ends of said first pair of non-linear side walls.

2. An assembly as set forth in claim 1 wherein said first pair of sidewalls each have a first arcuate support portion located between said first extension and said first curved distal end, said first arcuate support portion defining a first center.

3. An assembly as set forth in claim 2 wherein said second pair of sidewalls each have a second arcuate support potion located between said second extension and said second curved distal end, said second arcuate support portion defining a second center, said second center being different than said first center.

4. An assembly as set forth in claim 3 wherein said second track is resiliently supported with respect to said first track, said second track being supported on a bearing located between said first and second tracks and engaged by said first and second arcuate support portions.

5. An assembly as set forth in claim 4 wherein said bearing is a ball bearing defining a first diameter.

6. An assembly as set forth in claim 5 wherein said first and second arcuate support portions together define a second diameter, said second diameter being less than said first diameter.

7. An assembly as set forth in claim 1 wherein said first pair of non-linear sidewalls are located between said second pair of non-linear sidewalls.

8. An assembly as set forth in claim 7 wherein said first curved distal ends curve outwardly from said first pair of non-linear sidewalls toward said second pair of non-linear sidewalls.

9. An assembly as set forth in claim 8 wherein said second extensions extend inwardly from said second pair of non-linear sidewalls toward said first pair of non-linear sidewalls, said second extensions for engaging said first curved distal ends to prevent said second track from separating from said first track.

10. An assembly as set forth in claim 7 wherein said second curved distal ends curve inwardly toward said first pair of non-linear sidewalls.

11. An assembly as set forth in claim 10 wherein said first extensions extend outwardly from said first pair of non-linear sidewalls toward said second pair of non-linear sidewalls, said first extensions for engaging said second curved distal ends to prevent said second track from separating from said first track.

12. A seat track assembly for a vehicle comprising:
    a first track having a first pair of sidewalls interconnected by a first base portion, said first pair of sidewalls each having a first arcuate bearing surface;
    a second track moveably relative to said first track and having a second pair of sidewalls interconnected by a second base portion, said second pair of sidewalls each having a second arcuate bearing surface opposite from said first arcuate bearing surface; and
    a bearing member presenting a bearing surface for engaging said first and second arcuate bearing surfaces, said bearing member for resiliently supporting said second track with respect to said first track.

13. An assembly as set forth in claim 12 wherein said first arcuate bearing surface defines a first center and said second arcuate bearing surface defines a second center, said first center being different than said second center.

14. An assembly as set forth in claim 12 wherein said first and second arcuate bearing surfaces together define a first diameter and said bearing member defines a second diameter, said first diameter being less than said second diameter.

15. An assembly as set forth in claim 12 wherein said first pair of sidewalls each include a first end and a second end and said second pair of sidewails each include a third end and a forth end, said first, second, third, and forth ends all having a curved surfaces with said curved surface of said first end generally facing said curved surface of said forth end and said curved surface of said third end generally facing said curved surface of said second end.

16. An assembly as set forth in claim 15 wherein said first arcuate bearing surface is located between said first and second ends of said first pair of sidewalls and said second arcuate bearing surface is located between said third and forth ends of said second pair of sidewalls.

17. An assembly as set forth in claim 16 wherein said first and forth ends are in a hooked relationship and said second and third ends are in a hooked relationship for preventing said first and second tracks from separating from one another.

18. A method for assembling a seat track assembly for a vehicle comprising the steps of:

fixing a first track to a vehicle structure;

supporting a second track relative to the first track such that a gap having a first predetermined cross sectional area is formed; and inserting at least one bearing member into the gap between the tracks for resiliently supporting the second track for movement relative to the first track.

19. A method as set forth in claim 18 wherein at least one bearing member is a plurality of bearing members each having a second predetermined cross sectional area, the first cross sectional area being less than the second cross sectional area, and the method further includes the step of pressing each of the bearing members in to the gap for forming an interference fit between the bearing members and the first and second tracks.

* * * * *